United States Patent [19]

Harder, Jr.

[11] 4,059,306

[45] Nov. 22, 1977

[54] SEAT WITH REMOVABLE SEAT CUSHION

[75] Inventor: Arthur J. Harder, Jr., Franklin Park, Ill.

[73] Assignee: Coach and Car Equipment Corporation, Elk Grove Village, Ill.

[21] Appl. No.: 708,480

[22] Filed: July 26, 1976

[51] Int. Cl.² ............................................. A47C 5/06
[52] U.S. Cl. .................................... 297/452; 297/218
[58] Field of Search ............... 297/218, 219, 232, 445, 297/452, 455; 5/355

[56] References Cited

U.S. PATENT DOCUMENTS

| | | | |
|---|---|---|---|
| 2,257,211 | 9/1941 | Willoughby | 297/DIG. 1 |
| 2,534,502 | 12/1950 | Dewey | 297/218 X |
| 3,065,031 | 11/1962 | Henry | 297/DIG. 1 |
| 3,127,216 | 3/1964 | Clouse | 297/DIG. 1 |
| 3,323,835 | 6/1967 | Barecki | 297/219 |
| 3,328,085 | 6/1967 | Schwartz et al. | 297/452 |
| 3,560,049 | 2/1971 | Burton | 297/452 |
| 3,797,887 | 3/1974 | Barecki et al. | 297/232 |
| 3,873,155 | 3/1975 | Barecki | 297/455 |

Primary Examiner—Francis K. Zugel
Attorney, Agent, or Firm—Merriam, Marshall & Bicknell

[57] ABSTRACT

A seat frame carries a serpentine spring which carriers a cushion comprising a foam slab enclosed within a fabric cover having a zipper for removing the slab from within the cover. The cushion is attached to the front of the seat frame with threaded fasteners engaging a rigid strip within the cushion at the bottom front portion thereof. The cushion is attached to the rear of the seat frame with snap fasteners. A back panel member cooperates with the fasteners to prevent pilferage of the seat cushion.

7 Claims, 7 Drawing Figures

U.S. Patent Nov. 22, 1977 4,059,306
FIG. 1
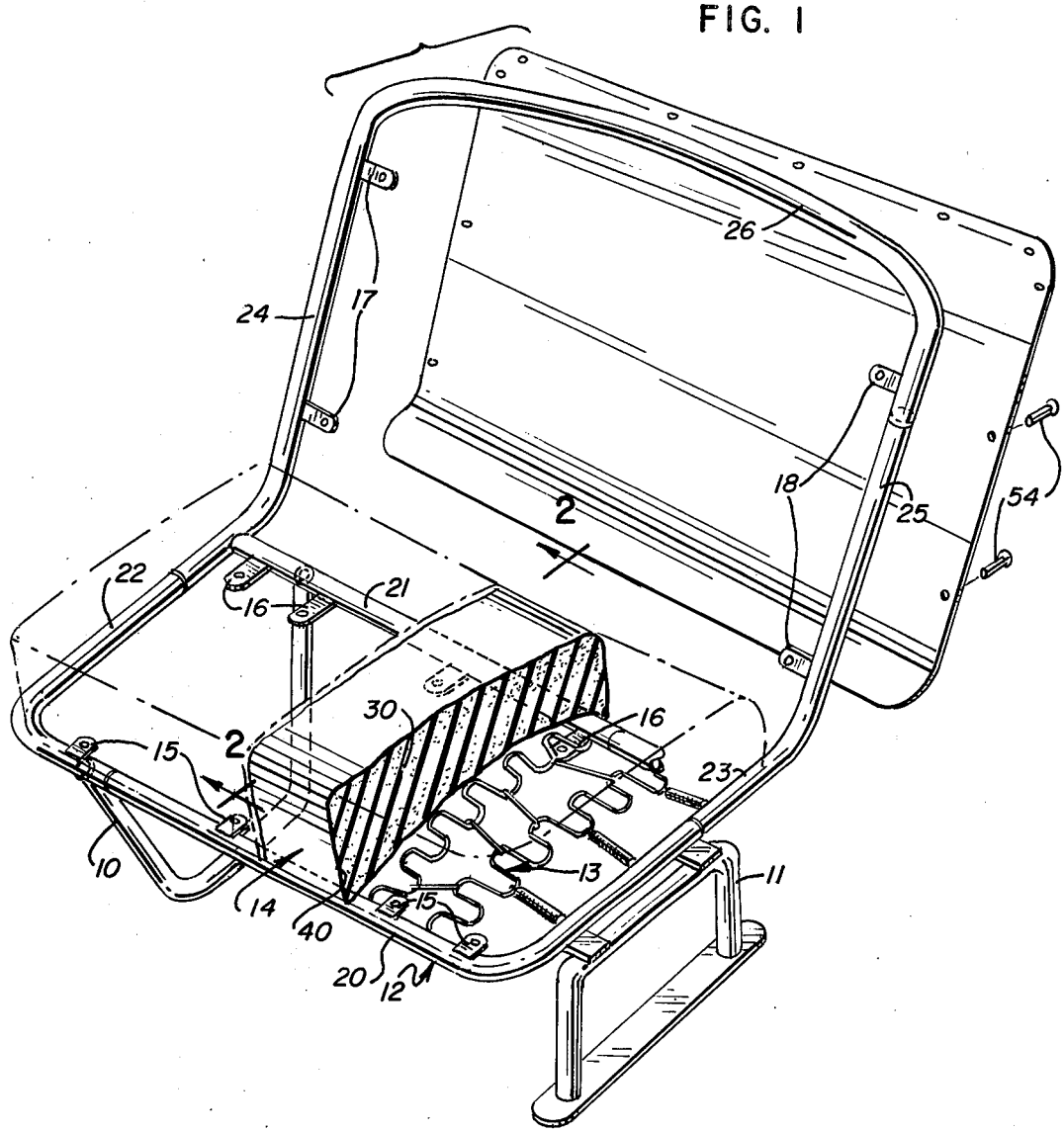
FIG. 5
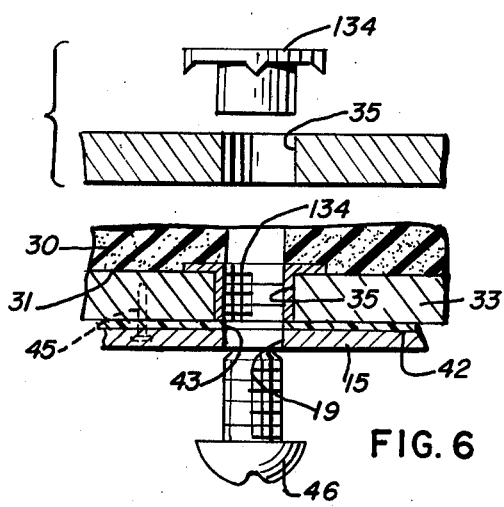
FIG. 6
FIG. 7
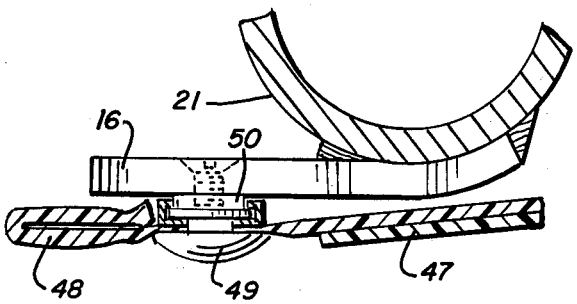

SEAT WITH REMOVABLE SEAT CUSHION

BACKGROUND AND SUMMARY OF THE INVENTION

The present invention relates generally to seats for use on mass transit vehicles such as buses or subway cars, and more particularly to seats of that type in which the seat cushion is removable and the cover on the cushion is replaceable.

In mass transit vehicles, a seat cushion is subjected to vandalism, pilferage and extreme conditions of wear, in turn requiring relatively frequent replacement and repair of the seat cushion, and this entails substantial expenditure of time, effort and money.

In accordance with the present invention there is provided a seat having a seat cushion which is readily removable from the seat for repair or replacement, yet the cushion is not readily pilferable. In addition, the removable seat cushion may have its cover removed and replaced without necessitating the replacement of the entire seat cushion when the cover has worn out or been vandalized.

BRIEF DESCRIPTION OF THE DRAWING

FIG. 1 is a perspective view, partially in phantom and partially in section of a seat having a seat cushion in accordance with the present invention;

FIG. 5 is a fragmentary sectional view of a rigid strip and fastener element associated with the seat cushion;

FIG. 6 is a fragmentary sectional view showing the attachment of the seat cushion to the front of the seat frame; and FIG. 7 is a fragmentary sectional view showing the attachment of the seat cushion to the back of the seat frame.

DETAILED DESCRIPTION

Figure 2:
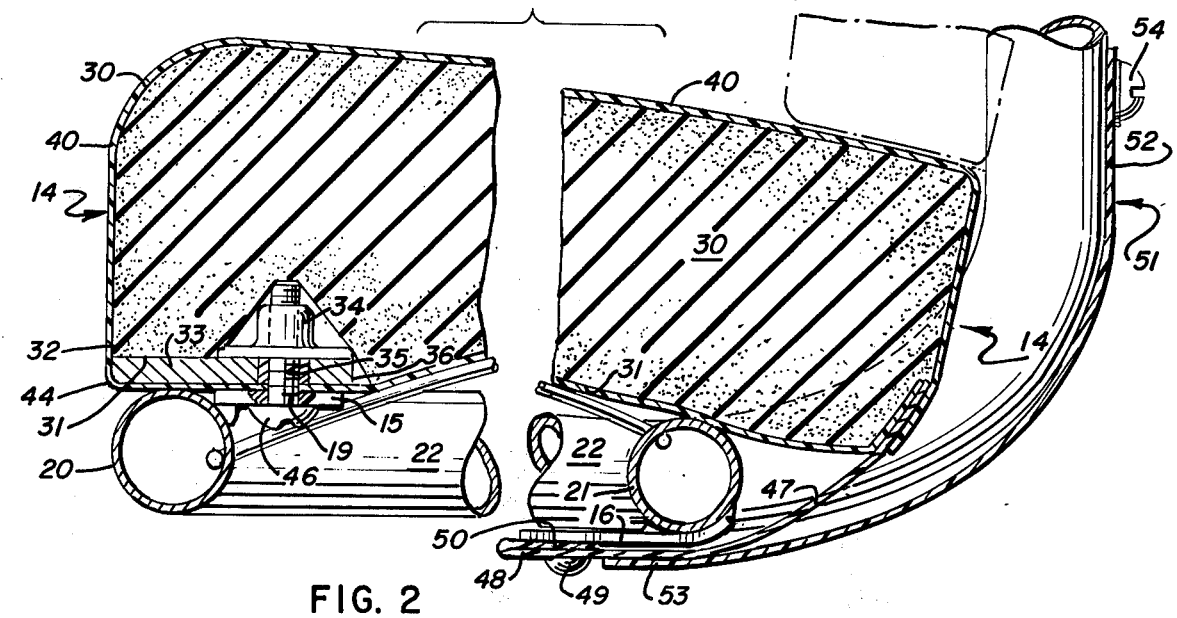
FIG. 2 is a fragmentary side sectional view of the seat cushion and associated structure on the seat.

Referring initially to FIG. 1, there is illustrated a seat comprising a pair of legs 10, 11 supporting a seat frame 12 on which is mounted a serpentine spring 13 attached to frame 12 in a conventional manner. A seat cushion 14, without internal springs, is mounted atop serpentine spring 13 and attached to frame 12 in a manner described below.

Frame 12 comprises a front frame member 20 connected by side frame members 22, 23 to a rear frame member 21. Extending upwardly from side frame members 22, 23 are back frame portions 24, 25, respectively, connected at their upper ends by top frame portion 26.

Figure 3:
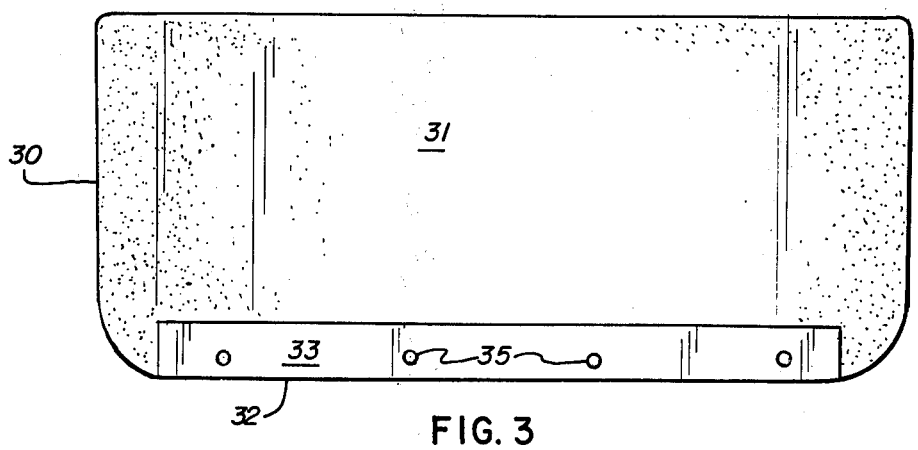
FIG. 3 is a bottom view of the seat cushion with its cover removed.

Extending rearwardly from the top of front frame member 20 are a plurality of front cushion-mounting brackets 15. Extending forwardly from the bottom of rear frame member 21 are a plurality of rear cushion-mounting brackets 16. Extending inwardly from back frame portions 24, 25 are brackets 17, 18, respectively, for mounting a seat back (not shown). Referring to FIGS. 2, 3 and 5, cushion 14 comprises a foam slab 30 having a bottom surface 31 in turn having a forward edge 32. Near the slab's forward edge 32, a rigid strip 33 is attached, e.g., with adhesive. The strip may be composed of wood, thin metal, paperboard or plastic, all non-elastic materials. Extending from the top surface of strip 33 downwardly through a hole 35 in the strip is an internally threaded fastener-receiving element such as a pall nut 34 (FIG. 2) or a tee nut 134 (FIGS. 5 and 6) fixed to strip 33. A plurality of such fastener-receiving elements 34 are attached to the strip 33 along the length thereof, and a plurality of holes 35 are formed through the strip to receive fastener-receiving elements 34.

Figure 4:
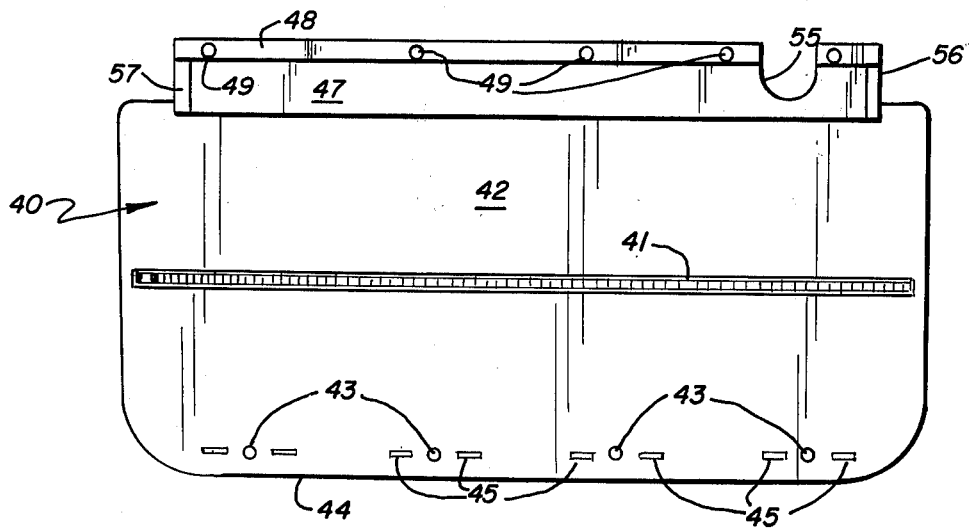
FIG. 4 is a bottom view of the seat cushion with the cover in place.

Referring to FIGS. 2, 4 and 6, foam slab 30 is enclosed within a fabric cover 40 which is presewn in one piece and has a zipper 41 extending from one side of the cover to the other along the cover's bottom 42 (see FIG. 4) coextensive with rigid strip 33. In FIG. 4, zipper 41 extends parallel to strip 33, but the zipper may also extend diagonally along bottom 42. To assemble slab 30 within fabric cover 40, zipper 41 is unzipped, slab 30 is inserted within cover 40, and zipper 41 is zipped shut. Rigid strip 33 is narrow enough to permit slab 30 to be elastically deformed sufficiently to allow insertion of the slab within its cover when zipper 41 is open.

Cover bottom 42 has a series of holes 43 near the forward edge 44 thereof, for registry with holes 35 in the bottom of rigid strip 33 (see FIG. 6), there being one opening 43 for each opening 35. Once holes 35, 43 are in registry with each other, the registry is maintained by fastening cover 40 to strip 33, e.g., with staples 45 (FIGS. 4 and 6).

After slab 30 is enclosed within fabric cover 40, the cushion is mounted atop seat frame 12 in a manner now to be described.

Cushion 14 is attached to the front of seat frame 12 by structure shown in FIGS. 2 and 6. The cushion is placed atop seat frame 12 with holes 35, 43 in cushion 14 aligned with holes 19 in front mounting brackets 15 of seat frame 12. Screws 46 are then inserted through holes 19 in front mounting brackets 15 and into registered holes 43, 35 (in seat cover 40 and rigid strip 43, respectively) for threaded engagement with fastener-receiving elements 34 (or 134). Each fastener-receiving element 34 (or 134) is secured by a screw 46 to a respective front mounting bracket 15. When thus secured, rigid strip 33 extends laterally over substantially the full length of front mounting bracket 15, and the rear edge 36 of the rigid strip is located substantially no further rearwardly than the underlying front mounting bracket 15.

The cushion is attached to the rear of seat frame 12 by structure shown in FIGS. 2, 4 and 7. Attached to the bottom 42 of seat cover 40, at the rear of the seat cover, is a flap 47 having a flap end 48. Flap 47 is extended around the outside of and underneath the bottom of rear frame member 21, terminating at flap end 48 located forwardly of rear frame member 21. Snap elements 49 on flap end 48 are attached to mating snap elements 50 on the bottom of rear cushion-mounting brackets 16 (see FIG. 7). There is a bracket 16 with a snap element 50 thereon for each of the snap elements 49 on flap end 48.

Screws 46, which attach cushion 40 to front cushion mounting brackets 15, are typically phillips head screws or other threaded fasteners requiring a special tool to remove them from the fastener-receiving elements 34 on cushion 14. This type of fastener reduces the susceptibility of cushion 14 to pilferage. Thus, even if the snap elements 49, 50 are disengaged from each other, at rear cushion mounting bracket 16, the cushion 14 is still not readily pilferable because the cushion cannot be removed from seat frame 12 without a special tool to remove screws 46. Further augmenting the pilfer-proof characteristics of seat cushion 14 is structure now to be described.

Referring to FIGS. 1 and 2, indicated generally at 51 is a substantially vertically disposed back panel member having an upper portion 52 and a bottom end portion 53 extending downwardly and inwardly around the outside of and underneath rear frame member 21 and outwardly of or below seat cover flap 47, the latter being engaged to rear mounting bracket 16 by snap elements 49, 50. Back panel member 51 is attached to seat frame 12 at appropriate places such as back frame portions 24, 25, or to the rearmost parts of side frame members 22, 23 by fasteners 54 which are typically phillips head screws or other threaded fasteners which require special tools to unscrew them. When back panel member 51 is attached to frame 12 by screws 54, seat cover flap 47 is held irremovably in position between panel member 51 and rear frame member 21. In order to remove flap 47 from its position between panel 51 and rear frame member 21, at least some of screws 54 must be partially or totally disengaged from the seat frame.

Seat cushion 14 cannot be pilfered from seat frame 12 without first removing flap 47 from its position between panel 51 and rear frame member 21, and this cannot be accomplished without first loosening or removing at least some of screws 54, and that operation requires special tools. Moreover, even if flap 47 is removed from the above-described position, seat cushion 14 is still incapable of being removed from the seat frame without disengaging screws 46 which attach the seat cushion to the front mounting brackets 15. That disengagement also requires a special tool.

On the other hand, for authorized maintenance or repair purposes, the seats are readily removable by maintenance personnel who would normally carry with them the special tools (e.g., the correct size of phillips head screwdriver) required to disengage fasteners 46 and 54.

Thus, when a seat cover 40 wears out, a replacement can be made in the field very readily while salvaging all the other elements of cushion 14. Replacement is accomplished merely by unscrewing fasteners 46 at the front of the seat and loosening at least some of fasterners 54 at the back of the seat and unsnapping the snap elements 49, 50 at the rear of the seat, thereby permitting removal of cushion 14 from seat frame 12. Seat cover 40 may then be separated from foam slab 30 after pulling out staples 45, which attach cover 40 to rigid strip 33, and unzipping zipper 41. Rigid strip 33 is narrow enough to permit such elastic deformation of slab 30 as is required to remove the slab from within cover 40 when zipper 41 is open.

Staples 45 may, if desired, be removed immediately after seat cushion 14 is attached to front cushion mounting bracket 15, staples 45 having served their purpose of maintaining holes 35, 43 in registry prior to the attachment of the seat cushion to front cushion mounting brackets 15. Thereafter, staples 45 still perform the registry-maintaining function, but this function is also performed by screws 46 which extend through both openings 35, 43.

Normally, when the seat is replaced, both foam slab 30 and rigid strip 33 are reusable. However, if fastener-receiving elements 34 or 134 have worn out, rigid strip 33 can be replaced without having to replace foam slab 30. The rigid strip is merely separated from the slab, the two having been held together by adhesive, and a new rigid strip is substituted. Rigid strip 33 is sufficiently narrow to permit insertion in and removal from cover 40 of foam slab 30, but strip 33 is also sufficiently wide to mount front fastener receiving elements 34 or 134 on the strip.

Occasionally, the interior of a cushion needs to be replaced. However, because the seat utilizes a spring 13 which is separate and discrete from the cushion and is attached directly to the seat frame, rather than utilizing springs contained within the seat cushion, the springs need not be replaced merely because the cushion needs to be replaced. Also, because the spring is attached to the frame rather than being enclosed within the cushion, a serpentine spring may be utilized, and this is more economical than the coil spring normally used when the spring is within the cushion, the latter also requiring a subframe, as part of the cushion, to mount the coil springs upon.

Referring to FIG. 7, seat cover flap 47 has a side edge 56 adjacent which is a cut-out portion 55 for accommodating the rear portion of seat leg 10. The other seat leg 11 is normally located to the outside of the other flap side edge 57.

The foregoing detailed description has been given for clearness of understanding only, and no unnecessary limitations should be understood therefrom, as modifications will be obvious to those skilled in the art.

What is claimed is:

1. In a seat;
    a seat frame including front and rear frame members;
    serpentine spring means located between said front and rear frame members;
    a plurality of brackets extending rearwardly from said front frame member;
    an elastically deformable seat cushion resting atop and supported by said serpentine spring means;
    a narrow, rigid, non-elastic strip attached to the bottom of said seat cushion at the front end thereof and overlying said brackets;
    a plurality of threaded fastener means fixedly mounted on said rigid strip;
    a removable fabric cover completely enclosing said cushion;
    said fabric cover comprising a bottom underlying the entire bottom of said cushion and having a front end portion underlying said rigid strip;
    a plurality of openings in the bottom of said cover at the front end portion thereof, there being an opening for, and in registry with, each fastener means on the rigid strip;
    threaded means for securing each of said fastener means to a respective one of said rearwardly extending brackets;
    and zipper means on the bottom of said cover, said zipper means extending coextensive with said rigid strip;
    said rigid strip having a rear edge located substantially no further rearwardly than said rearwardly extending brackets;
    said rigid strip being narrow (a) enough to permit removal of the elastically deformable cushion from within its cover when said zipper means is open and (b) wide enough to mount said threaded fastener means thereon.

2. In a seat as recited in claim 1 and comprising:
    a flap at the rear of said fabric cover extending around the outside of and underneath said rear frame member and terminating at a flap end located forwardly of said rear frame member;

a plurality of snap fasteners on said flap end;

a plurality of brackets extending forwardly from said rear frame member, there being one bracket for each snap fastener on said inner flap end;

and means on each of said forwardly extending brackets for engaging a respective one of said snap fasteners on said flap end.

3. In a seat as recited in claim 2 and comprising:

a substantially vertically disposed, rigid back panel member having a bottom end portion extending around the outside of and underneath said rear frame member, outwardly of said flap;

fastener means for engaging said back panel member to said frame;

and means on said bottom end portion of the back panel member for holding said flap in a position between said panel member and said rear frame member and for preventing removal of said flap from said position without disengaging said fastener means.

4. In a seat as recited in claim 1 and comprising:

means for maintaining each of said openings in the bottom of said cover in registry with a respective fastener means on said strip when said threaded securing means are disengaged from their respective threaded fastener means.

5. In a seat as recited in claim 1 wherein said threaded securing means is of the type requiring a special tool for unscrewing the securing means.

6. In a seat as recited in claim 5 and comprising:

a flap at the rear of said fabric cover extending around the outside of and underneath said rear frame member and terminating at a flap end located forwardly of said rear frame member;

a plurality of snap fasteners on said flap end;

a plurality of brackets extending forwardly from said rear frame member, there being one bracket for each snap fastener on said inner flap end;

and means on each of said forwardly extending brackets for engaging a respective one of said snap fasteners on said flap end;

a back panel member attached to said seat frame;

and means on said back panel member for holding said flap in a position between said panel member and said rear frame member and for preventing removal of said flap from said position.

7. In a seat as recited in claim 1 and comprising:

a flap at the rear of said fabric cover extending around the outside of and underneath said rear frame member and terminating at a flap end located forwardly of said rear frame member;

a plurality of snap fasteners on said flap end;

a plurality of brackets extending forwardly from said rear frame member, there being one bracket for each snap fastener on said inner flap end;

and means on each of said forwardly extending brackets for engaging a respective one of said snap fasteners on said flap end;

a back panel member attached to said seat frame;

and means on said back panel member for holding said flap in a position between said panel member and said rear frame member and for preventing removal of said flap from said position.

* * * * *

UNITED STATES PATENT AND TRADEMARK OFFICE
CERTIFICATE OF CORRECTION

PATENT NO. : 4,059,306
DATED : November 22, 1977
INVENTOR(S) : Arthur J. Harder, Jr.

It is certified that error appears in the above-identified patent and that said Letters Patent are hereby corrected as shown below:

Col. 2, line 38, "43", second occurrence, should be -- 33 --.

Col. 3, line 63, after "seat" insert --cover--.

Col. 4, line 61, after "being" insert --(a)-- and delete "(a)" after "narrow".

Abstract, line 1, "carriers" should be --carries--.

Signed and Sealed this

Fourth Day of April 1978

[SEAL]

Attest:

RUTH C. MASON
Attesting Officer

LUTRELLE F. PARKER
Acting Commissioner of Patents and Trademarks